(12) United States Patent
Popp (10) Patent No.: US 8,335,409 B2
(45) Date of Patent: Dec. 18, 2012

(54) OPTICAL ROTARY JOINT WITH ACTIVE MOVEMENT COMPENSATION

(75) Inventor: Gregor Popp, Müchen (DE)

(73) Assignee: Schleifring und Apparatebau GmbH, Fürstenfeldbruck (DE)

( * ) Notice: Subject to any disclaimer, the term of this patent is extended or adjusted under 35 U.S.C. 154(b) by 206 days.

(21) Appl. No.: 12/664,853

(22) PCT Filed: May 7, 2008

(86) PCT No.: PCT/EP2008/055616
§ 371 (c)(1),
(2), (4) Date: Jun. 4, 2010

(87) PCT Pub. No.: WO2009/000590
PCT Pub. Date: Dec. 31, 2008

(65) Prior Publication Data
US 2010/0296777 A1    Nov. 25, 2010

(30) Foreign Application Priority Data
Jun. 28, 2007 (DE) .......................... 10 2007 030 258

(51) Int. Cl.
*G02B 6/26* (2006.01)
(52) U.S. Cl. ............................................ 385/26
(58) Field of Classification Search .................... 385/26
See application file for complete search history.

(56) References Cited

U.S. PATENT DOCUMENTS

| | | |
|---|---|---|
| 5,568,578 A | 10/1996 | Ames |
| 6,738,539 B2 | 5/2004 | Hagood et al. |
| 7,106,925 B2 | 9/2006 | Dames et al. |
| 7,246,949 B2 | 7/2007 | Thiele et al. |
| 2003/0128912 A1 | 7/2003 | Dames et al. |
| 2004/0017984 A1 | 1/2004 | Thiele et al. |
| 2005/0036735 A1 | 2/2005 | Oosterhuis |
| 2005/0100268 A1 | 5/2005 | Foster et al. |

FOREIGN PATENT DOCUMENTS

| | | |
|---|---|---|
| DE | 10336925 | 3/2005 |
| JP | 57086803 | 5/1982 |
| JP | 59201011 | 11/1984 |
| JP | 63073703 | 5/1988 |

OTHER PUBLICATIONS

International Search Report for PCT Application No. PCT/EP2008/055616.
Speer et al. "The Diversity of Fiber Optic Rotary Connectors (Slip Rings)" Proceedings of the SPIE, vol. 839, Jan. 1987, p. 122-129.

*Primary Examiner* — Jerry Rahll
(74) *Attorney, Agent, or Firm* — Meyertons, Hood, Kivlin, Kowert & Goetzel, P.C.; Eric B. Meyertons

(57) ABSTRACT

An optical rotary joint includes a first collimator arrangement for coupling on first light-waveguides, and a second collimator arrangement for coupling on second light-waveguides, with the second collimator arrangement being supported to be rotatable relative to the first collimator arrangement about a rotation axis. The collimator arrangements include collimators with an actuator that is adjustable along two axes. A control unit controls the actuators so that mechanical tolerances are compensated, and optical transmission loss between the collimator arrangements is minimal.

5 Claims, 5 Drawing Sheets

OPTICAL ROTARY JOINT WITH ACTIVE MOVEMENT COMPENSATION

CROSS-REFERENCE TO RELATED APPLICATIONS

This application is a continuation of pending International Application No. PCT/EP2008/055616 filed on May 7, 2008, which designates the United States and claims priority from German Patent Application 10 2007 030 258 filed on Jun. 28, 2007.

BACKGROUND OF THE INVENTION

1. Field of the Invention

The invention relates to a device for transmitting optical signals between units that are rotatable relative to each other, also known as a rotary coupling or rotary joint. With this, preferably a plurality of optical signals can be transmitted simultaneously along a plurality of channels.

2. Description of the Prior Art

Various transmission systems are known for transmission of optical signals between units that are rotatable relative to each other.

An optical rotary joint for a plurality of channels, comprising a Dove prism, is disclosed in U.S. Pat. No. 5,568,578. An arrangement having a plurality of GRIN lenses is provided for coupling-in or coupling-out light. The Dove prism must be rotated by a precise gear mechanism at exactly one-half of the angular velocity between the two units that are rotatable relative to each other.

SUMMARY OF THE INVENTION

Embodiments described herein are based, in part, on the object of improving the known prior art of rotary joints for transmission of optical signals, and particularly of further adapting it so that the elaborate gear mechanism can be dispensed with or simplified. Furthermore, preferably the arrangement should be configured so that higher mechanical tolerances of the bearing can be accepted.

In an embodiment, an optical rotary joint includes:
a first collimator arrangement for coupling-on a first set of light-waveguides including at least one light-waveguide;
a second collimator arrangement for coupling-on a second set of light-waveguides including at least one light-waveguide, which second collimator arrangement is supported to be rotatable relative to the first collimator arrangement about a rotation axis; and
a derotating optical element located in a light path between the first collimator arrangement and the second collimator arrangement;
wherein
at least one collimator arrangement includes at least one collimator with an actuator that is adjustable along two axes; and
at least one control unit is provided for controlling the at least one collimator so that it takes up a given position.

In another embodiment, an optical rotary joint includes:
a first collimator arrangement for coupling-on a first set of light-waveguides including at least one light-waveguide; and
a second collimator arrangement for coupling-on a second set of light-waveguides including at least one light-waveguide, which second collimator arrangement is supported to be rotatable relative to the first collimator arrangement about a rotation axis;
wherein
at least one collimator arrangement includes at least one collimator with an actuator that is adjustable along two axes; and
at least one control unit is provided for controlling the at least one collimator so that it is always aligned with an associated collimator of the respective other collimator arrangement independently from rotational movement of the second collimator arrangement relative to the first collimator arrangement.

In another embodiment an optical rotary joint includes:
a first collimator arrangement for coupling-on a first set of light-waveguides including at least one light-waveguide; and
a second collimator arrangement for coupling-on a second set of light-waveguides including at least one light-waveguide, which second collimator arrangement is supported to be rotatable relative to the first collimator arrangement about a rotation axis;
wherein
at least one MEMS (Micro Electro-Mechanical System) mirror array is provided between the first set of light-waveguides and the second set of light-waveguides; and
at least one control unit is provided for controlling the at least one MEMS mirror array to deflect light from the at least one light-waveguide of one set of light-waveguides into a given light-waveguide of the other set of light-waveguides independently from rotational movement of the second collimator arrangement relative to the first collimator arrangement.

In one embodiment, a collimator arrangement for optical rotary joints includes at least one of a beam-guiding element and a beam-shaping element; and further includes:
at least one collimator with an actuator adapted to be adjusted along two axes; and
at least one control unit for controlling the at least one collimator so that it takes up a given position.

In another embodiment, a collimator arrangement for optical rotary joints, includes at least one of a beam-guiding element and a beam-shaping element; and further includes:
at least one collimator with an actuator adapted to be adjusted along two axes; and
at least one control unit for controlling the at least one collimator so that it is always aligned with an associated collimator of another collimator arrangement independently from a rotational movement of the collimator arrangement relative to the another collimator arrangement.

In another embodiment, a collimator arrangement for optical rotary joints, includes:
at least one MEMS mirror array between a first set of light-waveguides and a second set of light-waveguides; and
at least one control unit for controlling the at least one MEMS mirror array to deflect light from at least one light-waveguide of the first set of light-waveguides into an associated light-waveguide of the second set of light-waveguides independently from rotational movement of the first set of light-waveguides relative to the second set of light-waveguides.

BRIEF DESCRIPTION OF THE DRAWINGS

In the following the invention will be described by way of example, without limitation of the general inventive concept, on examples of embodiment and with reference to the drawings.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE DRAWINGS

Figure 1:
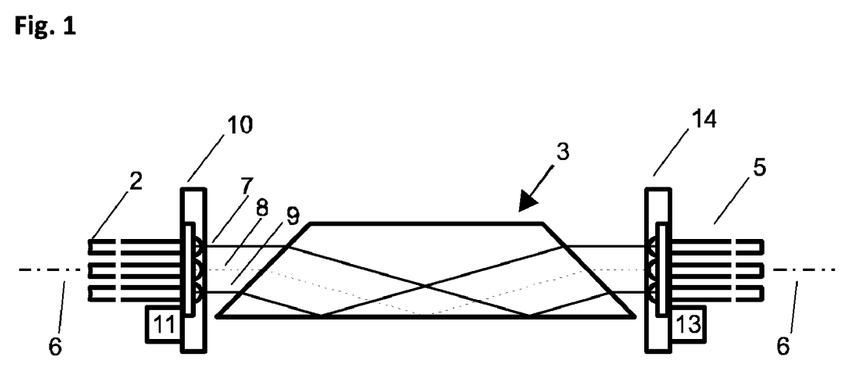
FIG. 1 schematically shows in a general form a collimator arrangement.

FIG. 1 shows in a schematic form a cross-section along the rotation axis 6 of an embodiment. The optical rotary joint includes a first collimator arrangement 10 for coupling-on a first set of light-waveguides 2, and also a second collimator arrangement for coupling-on a second set of light-waveguides 5. A derotating optical element which here is a Dove prism is disposed between the first collimator arrangement 10 and the second collimator arrangement 14. The ray path of three light rays 7, 8, 9 clearly shows the manner of functioning of the arrangement. Thus for example, light can be coupled-in through one of the first light-waveguides 2. The light is collimated in a direction parallel to the rotation axis 6 in the first collimator arrangement 10. The collimator arrangement 10 includes collimators having actuators that are adjustable along two axes. Here all collimators can be adjusted individually along two axes. The control of the collimators is effected by means of the control unit 11. Similarly the second collimator arrangement 14 includes collimators having actuators that are adjustable along two axes. Here too, all collimators can be adjusted individually along two axes. For control, the second control unit 13 is provided.

Figure 2:
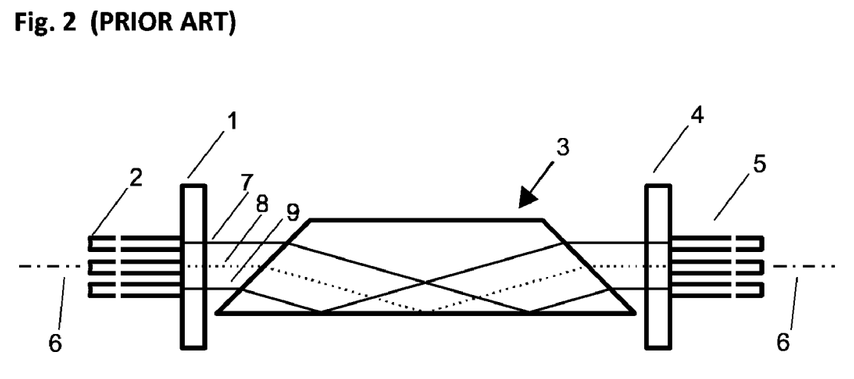
FIG. 2 shows an example of an arrangement according to prior art.

FIG. 2 shows in a schematic form an arrangement corresponding to prior art. The optical rotary joint includes a first collimator arrangement 1 for coupling-on first light-waveguides 2, and also a second collimator arrangement 4 for coupling-on second light-waveguides 5. The second collimator arrangement 4 is supported to be rotatable relative to the first collimator arrangement 1 about the rotation axis 6. A derotating element in the form of a Dove prism 3 is located in the beam path between the first collimator arrangement 1 and the second collimator arrangement 4 for compensation of the rotary movement. Examples of ray paths of three light rays 7, 8, 9 are illustrated as starting from a first set of light-waveguides 2, passing through the first collimator arrangement 1 and the Dove prism 3, and then via the second collimator arrangement 4 as far as the second light-waveguides 5.

Figure 3:
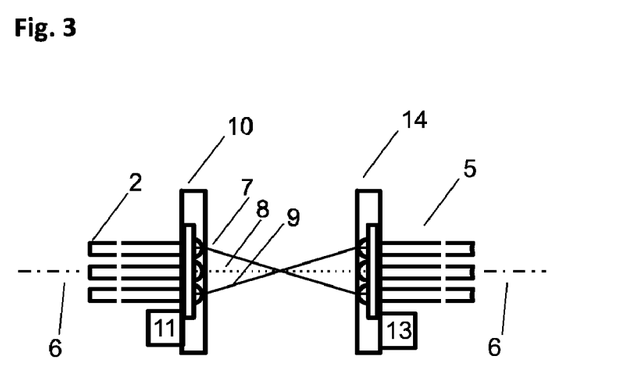
FIG. 3 shows another example of embodiment of a collimator arrangement.

FIG. 3 shows another variant of an arrangement. In this no derotating optical element is needed. The derotation is effected by the movement of the collimators themselves. A first control unit 11 is provided for the control of the first collimator arrangement 10. Control of the second collimator arrangement 14 is effected by the second control unit 13.

Figure 4:
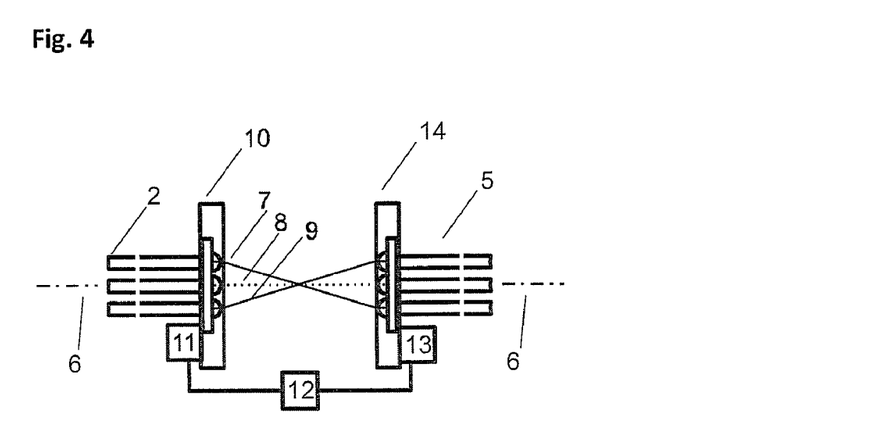
FIG. 4 shows the embodiment of FIG. 3 with an electrical rotary joint.

FIG. 4 shows another example of a rotary joint. An electrical rotary joint 12, for example a capacitive coupler, is provided for communication between the first control unit 11 and the second control unit 13.

Figure 5:
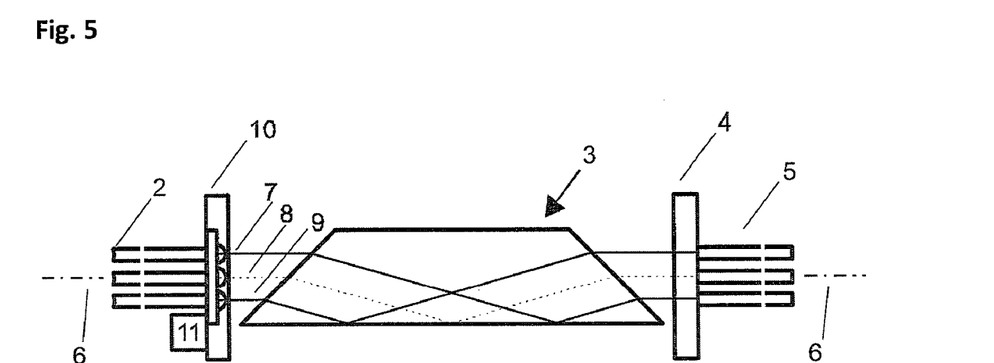
FIG. 5 shows an embodiment having a collimator arrangement with adjustable collimators, a derotating optical element, and a fixed collimator arrangement.

In FIG. 5 another arrangement having a derotating optical element is shown. Thus, a first collimator arrangement 10 having adjustable collimators controlled by a first control unit 11 is provided on one side of the derotating optical element 3. With this collimator arrangement tolerances of the entire rotary joint can be compensated. A second collimator arrangement 4 having fixed collimators for coupling-on to the second set of light-waveguides 5 is provided on the other side of the derotating optical element 3

Figure 6:
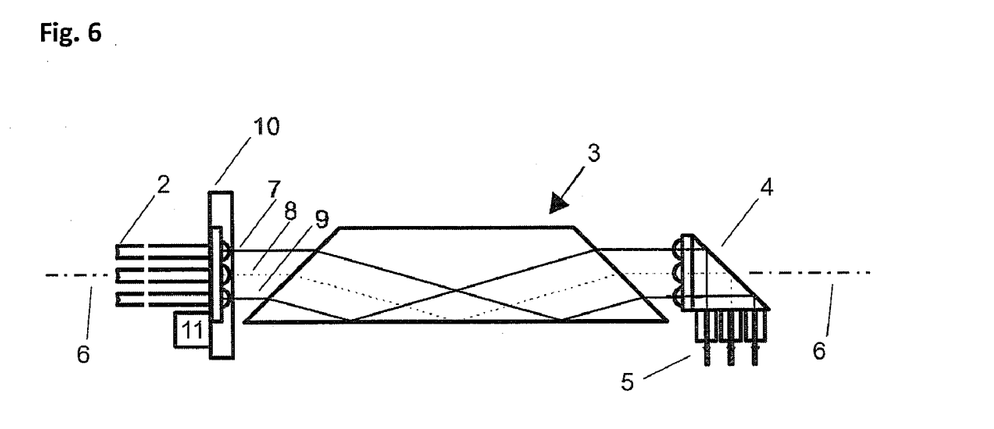
FIG. 6 shows an embodiment similar to that of FIG. 5, however with a collimator arrangement which deflects light by 90°.

FIG. 6 shows an arrangement corresponding to that of the preceding Figure. As distinct from this, the second collimator arrangement 4 is equipped with a deflecting unit which effects a deflection of the light by 90°. Of course, other angles of deflection are also possible. The arrangement illustrated here has the advantage that the second set of light-waveguides 5 can be disposed to be perpendicular to the rotation axis 6, which reduces the construction length of the arrangement.

Figure 7:
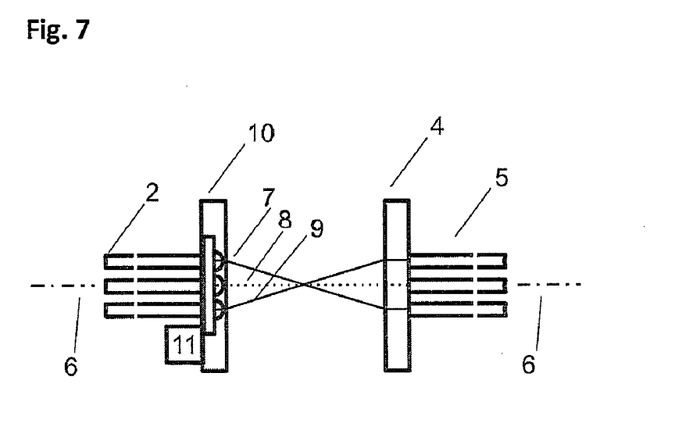
FIG. 7 shows an embodiment having a collimator arrangement with adjustable collimators and a fixed collimator arrangement, however without a derotating optical element.

FIG. 7 shows an arrangement having a first collimator arrangement with adjustable collimators 10 controlled by a first control unit 11, and a second collimator arrangement 4 corresponding to prior art. The derotation is effected in the first collimator arrangement with adjustable collimators 10. Here the collimators are adjusted according to the rotary movement. This arrangement is suitable only for transmitting light from the direction of the first collimator arrangement having adjustable collimators 10, because only the light from this direction can be deflected appropriately for compensating the rotary movement. The collimators of the second collimator arrangement 4 are not movable. Thus, light from the direction of this collimator arrangement cannot be derotated. In the case in which an optical channel is provided on the rotation axis 6, it can be used without derotation and therefore in both directions of transmission.

Figure 8:
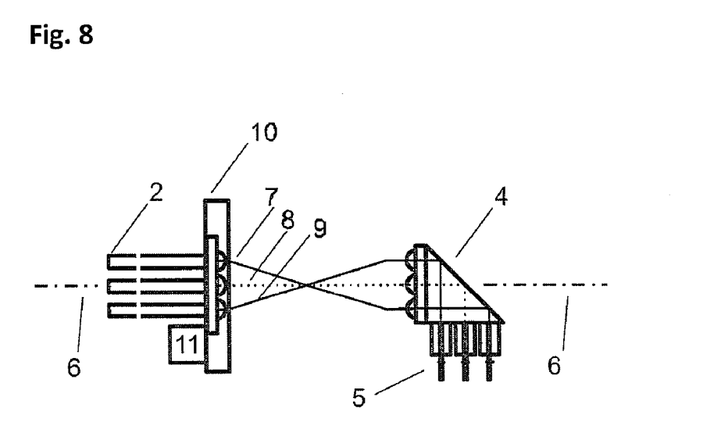
FIG. 8 shows an embodiment similar to that of FIG. 7, however with a collimator arrangement which deflects light by 90°.

FIG. 8 shows an arrangement similar to the one previously described, however here the second collimator arrangement 4 is designed to be a collimator having a 90° deflection, so that the second set of light-waveguides 5 can be disposed to be perpendicular to the rotation axis 6.

Figure 9:
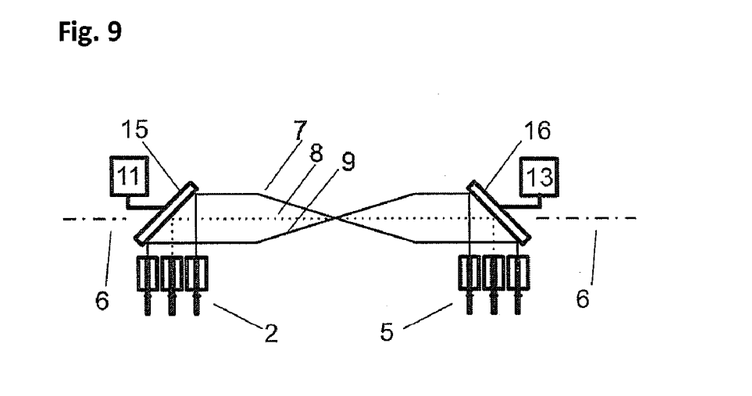
FIG. 9 shows an embodiment with two MEMS mirror arrays.

FIG. 9 shows an arrangement, having a first MEMS mirror array 15 controlled by a first control unit 11 and a second MEMS mirror array 16 controlled by a second control unit 13. The two MEMS mirror arrays 15, 16 serve for suitable assignment of channels, or derotation of the channels. With this arrangement, particularly short optical path lengths can be achieved, so that also the collimator lenses can be of simple design, or even dispensed with. If necessary, collimator lenses can be provided also on the first set of light-waveguides 2 and/or the second set of light-waveguides 5.

Figure 10:
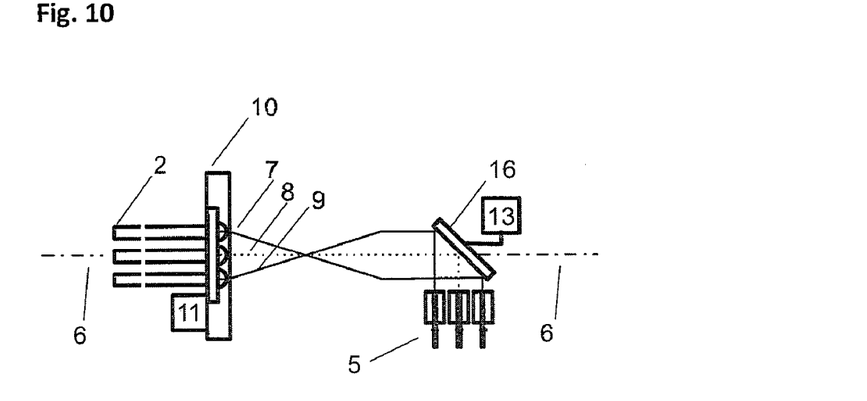
FIG. 10 shows an embodiment with an MEMS mirror array and a collimator arrangement with adjustable collimators.

FIG. 10 shows an arrangement having a first collimator arrangement with adjustable collimators 10 controlled by a first control unit 11, and a second MEMS mirror array 16 controlled by a second control unit 13.

Figure 11:
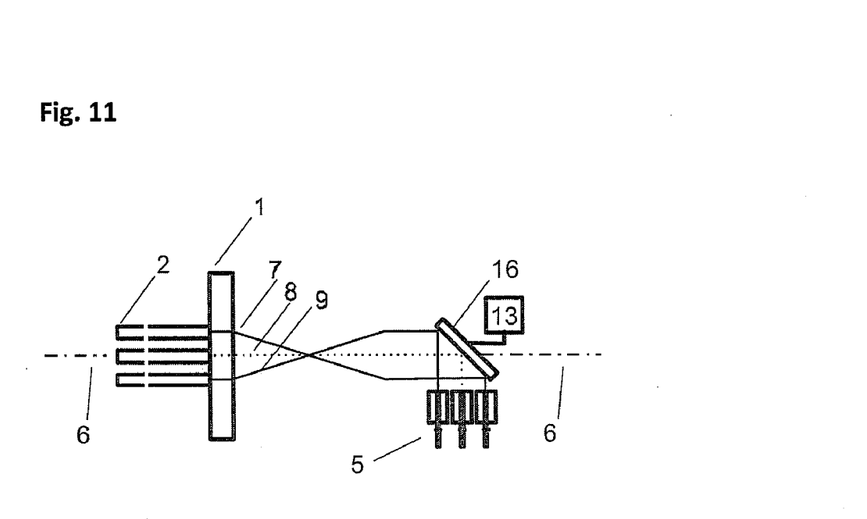
FIG. 11 shows an embodiment with an MEMS minor array and a collimator arrangement.

FIG. 11 shows a first collimator arrangement 1 with fixed collimators and a second MEMS mirror array 16 controlled by a second control unit 13. With suitable control of the mirrors, light coming from the first collimator arrangement 1 can be deflected into corresponding light-waveguides of the second set of light-waveguides 5. Similarly, light from the second set of light-waveguides 5 also can be deflected into any desired light-waveguides of the first set of light-waveguides 2 of the first collimator arrangement 1.

Figure 12:
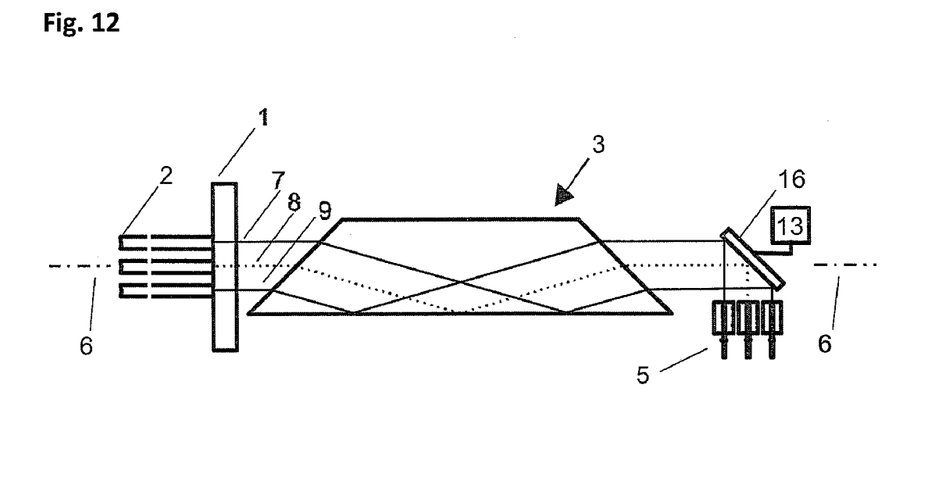
FIG. 12 shows an embodiment with a fixed collimator, a derotating element, and an MEMS mirror array with a collimator arrangement.

FIG. 12 shows another arrangement with a first collimator arrangement 1, a derotating element 3, and a second MEMS mirror array controlled by a second control unit 13. These examples of embodiment show only a few advantageous forms of embodiment. Of course, all possible combinations of the here illustrated elements can be put into practice. Thus, for example, an MEMS mirror array can be combined also with controllable collimators, and also optionally and additionally with a derotating element.

Figure 13:
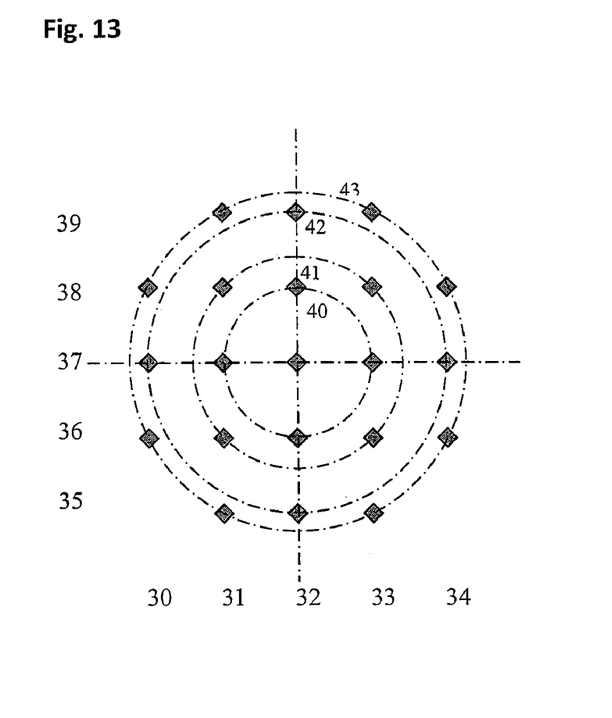
FIG. 13 shows a plan view of a matrix-shaped collimator arrangement.

FIG. 13 shows a matrix-shaped collimator arrangement in a plan view of the lenses. For better illustration, the matrix is divided into columns 30-34 and also rows 35-39. For better discernability the collimators are here depicted as rectangles. As the entire arrangement is rotated about its center point (the point of intersection of the two horizontally and vertically extending axes), the individual collimators move along circular tracks 40-43 which are numbered according to their radii from the inside to the outside. It is of advantage to minimize the angles of tilt of the individual collimators during the rotary movement. With this also the variation of the optical paths remains small. Thus, a smaller variation of the transmission losses during a rotation also results. For this to be achieved, the lateral spacing of the collimators of the first collimator arrangement 10 and the second collimator arrangement 14 should be kept to a minimum. This is attained by coupling collimators of the first collimator arrangement 10 having large radii with collimators of the second collimator arrangement having small radii. Advantageously the collimator at the central point is excepted from this. Thus, for example, the collimators of the first collimator arrangement 10 on the radius 43 can be coupled with the collimators of the second collimator arrangement 14 on the radius 40 and the radius 41. The collimators of the first collimator arrangement 10 on the radius 42 are coupled with the collimators of the second collimator arrangement 14 on the radius 43.

Figure 14:
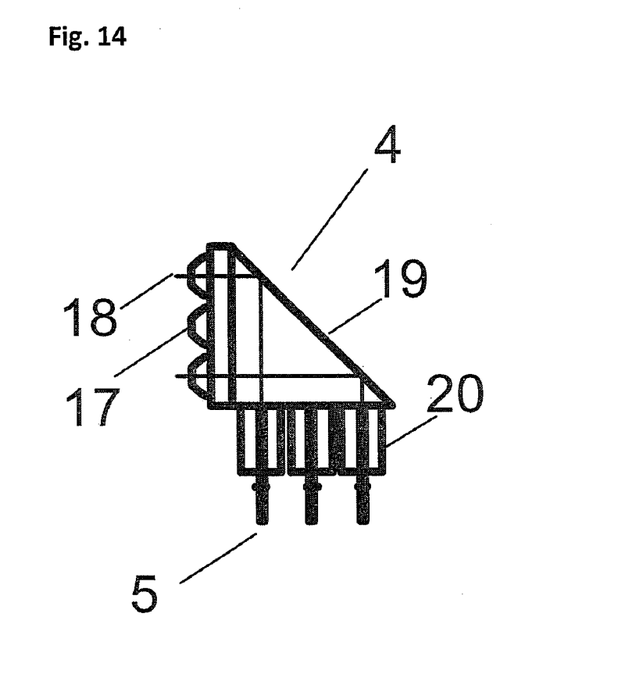
FIG. 14 shows details of an example of a collimator arrangement.

FIG. 14 shows details of an example of a collimator arrangement 4. The details illustrated here apply analogously also to the other drawings, even when they concern other collimator arrangements. The set of light-waveguides 5 consists of individual light-waveguides which are accommodated in ferrules 20. Instead of the ferrules, other kinds of fastening can be applied, such as for example with an adhesive, or by bonding on a support such as a glass plate or a prism. Instead of the ferrules, or also within the ferrules, lenses such as for example gradient refractive index lenses, or also spherical lenses can be present. With this, beam-guiding or beam-shaping is possible. Preferably light issuing from the individual light-waveguides of the set of light-waveguides is converted to a parallel light beam, and a parallel light beam coming from outside is focused into a light-waveguide by the lenses. Furthermore, optionally at least one lens 17 is provided for beam-guiding or beam-shaping or focusing. A typical ray path 18 between a light-waveguide 5 and a lens is shown. The light ray 18 emerges from a light-waveguide and is reflected from the rear side of the prism 19, and exits the latter through a lens 17.

DETAILED DESCRIPTION OF THE PREFERRED EMBODIMENTS

The device has two collimator arrangements 10, 14 which are disposed to be rotatable relative to each other about a rotation axis 6. An optical path for transmission of light exists between the first collimator arrangement 10 and the second collimator arrangement 14 disposed to be rotatable relative thereto. At least one derotating element, for example a Dove prism 3, serving to image the light emitted by the first collimator arrangement 10 onto the second collimator arrangement 14, and similarly also in an opposite direction, independently from the rotational movement between the two collimators, is located in this optical path. For this, the Dove prism is rotated at one-half of the angular velocity of the rotation of the first collimator arrangement 10 and the second collimator arrangement 14.

Each of the collimator arrangements 10, 14 includes at least one collimator and also at least one means for supporting the at least one collimator. The term "collimator" is here used in its broadest sense for a beam-guiding or beam-shaping element. The purpose of a collimator of this kind consists of converting the light conducted in a light-waveguide, for example a single-mode fiber or also a multi-mode fiber, to have a beam path which can be passed through the rotary joint and, in particular, through the derotating element. This corresponds to a beam path in free space or an optical medium such as, for example, glass or oil. Similarly, also a conversion in the opposite direction, i.e. from a beam path in the rotary joint to a path in a light-waveguide can be effected with a collimator. Of course, conversions in both directions inside a collimator are also conceivable, so that bidirectional signals can be transmitted. Typically, the collimators are lenses, preferably gradient-index lenses (GRIN lenses), and most preferably lenses of a micro-lens array. A collimator arrangement can be designed for any desired number of optical channels. In the simplest case it is designed for one single channel, but preferably for a number of channels greater than two. Accordingly, the terms "first set of light-waveguides 2" and "second set of light-waveguides 5" relate to at least one, and preferably to a plurality of light-waveguides.

Basically, the invention can be performed with all derotating optical elements. For the sake of clarity of illustration, reference is here made to a Dove prism. Similarly however, an Abbe-König prism or a mirror arrangement also can be used as a derotating element.

A collimator arrangement includes at least one collimator having an actuator that is adjustable along two axes. A tilting of the beam and/or a displacement of the beam is effected with the actuator. If, for example, the position of a light-waveguide in front of a collimator lens is shifted, then this results in a tilt of the beam behind the collimator lens. With the actuator the beam can be now adjusted so that the attenuation of the optical path is minimal. Optionally the at least one collimator can be adjustable along only one axis or along a larger number of axes. A control unit 11, 15 is provided for controlling the at least one actuator. The actuator is controlled by the control unit so that it takes-up a given position. This given position can be a fixed position. Alternatively, it can be dependent on time, or rotation angle, or also other parameters such as a temperature of the arrangement or a component. Similarly, it can be dependent on optical transmission parameters.

Optionally an own control unit can be assigned to each collimator arrangement. Preferably the two control units of the two collimator arrangements communicate optionally by means of optical signals, by means of capacitively coupled signals, or also by means of electrical signals transmitted via a slip ring. For this, suitable optical, capacitive, or inductive couplers 12 are then provided. Similarly, also one of the existing optical channels can be used for signaling. As an alternative to this, a common control unit for both collimator arrangements also can be provided.

The devices described herein are particularly advantageous when a fiber array is combined with a micro-lens array. Fiber arrays are normally very precise, but must be positioned on the micro-lens array. With a shift (without rotation) of the fiber array with respect to the micro-lens array a uniform angle of squint results which can be compensated by the actuator for the entire collimator unit.

In an embodiment, the actuator is provided for adjustment during a calibration procedure. Thus, for example, a calibration is performed for the first time before the arrangement is taken into operation, and also later at certain intervals during operation. For this, the attenuation of an optical path is measured and thereupon the actuator is suitably adjusted. The actuator is not adjusted during running operation. Thus, the calibration data can be stored in a memory, preferably a micro-controller, and called-up for running operation. During operation, the control unit accordingly always signals a constantly equal value. With an embodiment of this kind, optical adjustment of the arrangement can be simplified substantially. An elaborate mechanical adjustment in which the attenuation values are determined in a plurality of steps and the collimators are adjusted or fixed accordingly can now be replaced by a fully automatic or at least partially automatic calibration. However, here the demands made on tolerances of the bearing and the gear mechanisms are still relatively high, because fluctuations during operation cannot be compensated.

In another embodiment, the actuators are designed for continuous adjustment of the arrangement during operation. Thus, during rotation of the arrangement the actuator is continuously readjusted in order always to achieve a minimal attenuation of an optical path. During this, for example, signal amplitudes of an optical receiver can be evaluated. Alternatively, a reference channel can be also provided, to which an optical signal of known intensity is applied. The attenuation of the rotary joint can then be determined from the received signal at the other end of the optical path. However, also the signal amplitude of one or a plurality of channels could be monitored with a monitoring receiver. For this, a small portion, for example 1%, of the signal to be transmitted is coupled-out with an optical coupler and supplied to the monitoring receiver. Better results can be achieved when a first monitoring receiver is assigned to the first collimator arrangement, and a second monitoring receiver is assigned to the second collimator arrangement. Now, in at least one of the control units 11, 13 conclusions concerning the attenuation can be drawn by determining the ratio of the measured values.

Then the at least one actuator can be again readjusted on the basis of an amplitude or attenuation measurement, so that the attenuation becomes minimal or at least falls below a given limiting value. With this dynamic setting or regulating of the collimator positions low transmission losses can be achieved even during operation with relatively high mechanical tolerances of the arrangement. Thus, here too a larger clearance can be tolerated in the bearing and/or gear mechanism.

A low-cost arrangement results when only one collimator arrangement is equipped with actuators. Especially low transmission losses can be attained when both collimators are equipped with actuators. It is of particular advantage to equip the light transmitting side with an actuator so that the emitted light beam is always focused into the collimator of the respective other collimator arrangement. This brings about a substantial improvement of the squint angle, because derotating elements such as a Dove prism or mirrors double the squint angle at each reflection.

In another embodiment, the control unit has a sensor for determining the angular position between the two collimator arrangements. Furthermore, the control unit has a memory containing calibration data that are fed into the at least one actuator in dependence on position, so that the optical transmission losses between the first collimator arrangement and the second collimator arrangement is minimal.

In an embodiment, at least one actuator is designed to be an electrostatic, an electromagnetic, a piezoelectric, or a thermal actuator.

In another embodiment, at least one collimator arrangement includes a fiber-positioning unit as disclosed, for example, in US 2005/0100268 A1. The contents of this document are incorporated herein by reference.

In another embodiment, at least one collimator arrangement includes a fiber-switching unit as disclosed, for example, in U.S. Pat. No. 7,106,925 B2. The contents of this document are incorporated herein by reference.

Other embodiments are directed to a collimator arrangement for use in optical rotary joints.

Other embodiments are directed to an optical rotary joint with two collimator arrangements 10, 14 which are disposed to be rotatable relative to each other about a rotation axis 6. An optical path for transmission of light exists between the first collimator arrangement 10 and the second collimator arrangement 14 that is disposed to be rotatable relative thereto. As distinct from the preceding embodiment, there is no derotating optical element between the two collimator arrangements. Instead of this, at least one collimator having an actuator that is adjustable along two axes is provided for derotation. Thus, the at least one collimator with the adjustable actuator is moved by the control unit to follow the rotary movement so that it is always aligned with an associated collimator of the respective other collimator unit. Here too, collimators of this kind can be provided in only one collimator arrangement, but preferably in both collimator arrangements.

No derotating optical element, for example in the form of a Dove prism, is required, a series of advantages result. The spacing between the two collimator arrangements is reduced. The necessary spacing is now set by the maximum possible angle of deflection, and also by the size of a collimator arrangement. Considerable savings of weight result from the omission of a prism. Furthermore, the demands to be made on the mechanical tolerances of the arrangement are substantially less. Finally, it is also possible to use simpler collimators, because the spacing between the collimator arrangements is smaller, and correspondingly smaller convergence is needed. Thus, for example, fiber ends of lens-shaped design, or fiber tapers, could be sufficient.

The combination of a fiber array with a micro-lens array also is of especial advantage here, as already described above. Here the angles of squint can be compensated automatically.

Thereby higher tolerances in assembly, and therefore lower fabrication costs are made possible.

In another embodiment, the individual collimators of a collimator unit are not adjustable along at least two axes. Instead, the entire optical component group of the collimator unit is positioned along at least two axes. Thus, for example a micro-optical system supporting a multitude of collimators can be adjusted along at least two axes.

In another embodiment, positioning is effected along more than two axes. Thus, for example, another adjustment can be performed parallel to the rotation axis, i.e. along the longitudinal axis of the collimator.

In another embodiment, a micro-mechanical adjustment means is provided for adjusting at least one collimator. This can be designed for example in the form of a micro-gear mechanism. With this, the collimators themselves, or the fibers in front of the collimator lenses, can be moved.

Another embodiment provides for the individual collimators of the first collimator arrangement 10 and the second collimator arrangement 14 to be assigned to each other so that an advantageous, in particular a short movement track results. For this, for example, the outer collimators of the first collimator arrangement could be imaged onto the inner collimators at the center of rotation of the second collimator arrangement. A symmetrical or congruent arrangement of the individual channels in the collimator arrangements is not necessary.

In another embodiment, at least one of the control units 11, 13 is designed so that it can switch on or switch off individual channels, or also change channel assignments. Thus, for example, an imaging of an optical channel of the first collimator arrangement 10 onto a given other channel of the second collimator arrangement 14 can be effected by specific control of the actuator. If required, a switch-over onto another channel of the second collimator arrangement 14 could then be performed. Accordingly, a rotary joint is usable as a switching matrix. Thus, for example, a time-division multiplex of various channels can be achieved. Similarly, a re-configuration of the arrangement is also possible, for example in case the channels have been connected in a wrong order, or in case individual channels have faulty light-waveguides or rotary joint components, such as the collimator arrangements, for example.

According to another aspect, at least one MEMS (Micro-Electro-Mechanical System) mirror array is provided for selective beam deflection. By means of a MEMS mirror array of this kind a specific deflection of individual light rays from individual light-waveguides is also possible. Thus, also in the case of a combination with a derotating optical element such as, for example, a Dove prism, mechanical tolerances of the arrangement can be compensated. Similarly, a derotation is also possible when the individual mirrors are controlled in accordance with the rotational movement.

At least one MEMS mirror array 15, 16 is provided between the first set of light-waveguides 2 and the second set of light-waveguides 5. It is controlled by at least one control unit 11, 13 and deflects light from at least one light-waveguide of a set of light-waveguides 2, 5 into a given light-waveguide of the other set of light-waveguides 5, 2 independently from the rotation.

Preferably the mirrors are aligned with respect to the light beams from the individual light-waveguides so that a light beam falls onto a mirror. As an alternative to this, however, a light beam could also fall onto a plurality of mirrors, so that a redundant mirror system can be built-up which still functions in case one mirror fails. In addition, with a mirror system of this kind a division of a light beam into a plurality of light beams could be performed Various variants of the here described embodiments also could be combined with each other.

What is claimed is:

1. Optical rotary joint comprising at least:
a first collimator arrangement for coupling-on a first set of light-waveguides comprising at least one light-waveguide; and
a second collimator arrangement for coupling-on a second set of light-waveguides comprising at least one light-waveguide, which second collimator arrangement is supported to be rotatable relative to the first collimator arrangement about a rotation axis;
wherein
at least one MEMS (Micro Electro-Mechanical System) mirror array is provided between the first set of light-waveguides and the second set of light-waveguides; and
at least one control unit is provided for controlling the at least one MEMS mirror array to deflect light from the at least one light-waveguide of one set of light-waveguides into a given light-waveguide of the other set of light-waveguides independently from rotational movement of the second collimator arrangement relative to the first collimator arrangement.

2. Optical rotary joint according to claim 1, wherein the at least one control unit controls the at least one MEMS mirror array so that an optical transmission loss between the first collimator arrangement and the second collimator arrangement is minimal.

3. Optical rotary joint according to claim 1, wherein the at least one control unit comprises means for storing calibration data measured during a calibration, and feeds the at least one MEMS mirror array with measured values during operation.

4. Optical rotary joint according to claim 1, wherein the at least one control unit comprises means for determining transmission loss, and controls the at least one MEMS mirror array during operation so that optical transmission loss between the first collimator arrangement and the second collimator arrangement is minimal.

5. Optical rotary joint according to claim 1, wherein the at least one control unit comprises means for determining an angular position and controls the at least one MEMS mirror array during operation in dependence on the angular position.

* * * * *